United States Patent
Dugan et al.

(10) Patent No.: US 7,697,070 B1
(45) Date of Patent: Apr. 13, 2010

(54) METHOD OF PROVIDING STANDARD DEFINITION LOCAL TELEVISION CONTENT

(76) Inventors: Michael T Dugan, 7539 E. Inspiration Dr., Parker, CO (US) 80104; Mark W Jackson, 6720 Prentice Ave., Littleton, CO (US) 80124; Daniel J. Minnick, 10442 S. Lion's Path, Littleton, CO (US) 80124

( * ) Notice: Subject to any disclaimer, the term of this patent is extended or adjusted under 35 U.S.C. 154(b) by 1187 days.

(21) Appl. No.: 11/118,464

(22) Filed: Apr. 29, 2005

Related U.S. Application Data

(60) Provisional application No. 60/566,839, filed on Apr. 29, 2004.

(51) Int. Cl.
*H04N 5/46* (2006.01)

(52) U.S. Cl. ...................................... 348/556; 348/555

(58) Field of Classification Search ......... 348/554–558, 348/731–733
See application file for complete search history.

(56) References Cited

U.S. PATENT DOCUMENTS

| 5,461,427 | A | * | 10/1995 | Duffield et al. | 348/555 |
| 5,555,097 | A | * | 9/1996 | Joung et al. | 386/123 |
| 5,600,366 | A | * | 2/1997 | Schulman | 725/36 |
| 6,108,044 | A | * | 8/2000 | Shin | 348/555 |

* cited by examiner

*Primary Examiner*—M. Lee
(74) *Attorney, Agent, or Firm*—Setter Roche LLP

(57) ABSTRACT

A method and apparatus are disclosed that automatically switch between displaying local standard definition television content and non-local, high definition television content. When the same television content is available for display in both standard and high definition formats, the television converter device preferentially displays the high definition format.

17 Claims, 4 Drawing Sheets

METHOD OF PROVIDING STANDARD DEFINITION LOCAL TELEVISION CONTENT

RELATED APPLICATIONS

This application claims priority to U.S. Provisional Application Ser. No. 60/566,839, titled METHOD OF PROVIDING STANDARD DEFINITION LOCAL TELEVISION CONTENT filed Apr. 29, 2004, which application is hereby incorporated herein by reference.

FIELD OF THE INVENTION

This application relates generally to displaying television programming and more particularly to a method for displaying local television content.

BACKGROUND OF THE INVENTION

Some television content, such as sports events and movies, are now broadcast or otherwise delivered (such as via cable, satellite or Internet) to viewers in a high definition format. Many viewers prefer viewing television content in the high definition format over the standard definition format.

High definition format television content, however, typically requires substantially more bandwidth than the standard definition format television content. High definition format television content may also require more expensive equipment than is required to receive and display standard definition format television content. For these and other reasons, high definition television content is typically supplied only by programming distributors with a very large local audience (such as televisions stations in the New York, Chicago or Los Angeles markets) or with a national audience.

Television content is typically transmitted with advertising and news tailored to the audience. Thus, television content provided by a local programming distributor to a local market (e.g., a geographically distinct market) typically contains advertisements and news tailored for that local market. Likewise, national programming distributors typically contain national advertisements and news. Thus, there exists a problem where viewers who watch high definition television content from a non-local (i.e., content directed to a local market different from that in which the viewer resides or to a national market) programming distributor may therefore be unable to see local television advertisements or news. As a consequence, viewers often must select between viewing the higher-quality, high definition, but non-local, television content or the standard definition local television content.

Accordingly there is a need for providing local advertising to viewers of high definition television content when there is no local, high-definition programming distributor for the television content. The present invention provides a solution to this and other problems, and offers other advantages over the prior art.

SUMMARY OF THE INVENTION

In accordance with the present invention, the above and other problems are solved by automatically switching between displaying local, standard definition television content and non-local, high-definition television content. When the same television content is available for display by the television converter device in both standard and high definition formats, the television converter device preferentially displays the high definition format.

In one aspect of the present invention, a substantially national feed of high definition television content is received and displayed. Then it is determined when such high definition television content should be replaced with corresponding standard definition local television content. The corresponding standard definition local content is then received and displayed. When it is determined that such corresponding standard definition local content should be replaced with the substantially national feed of high definition television content, the substantially national feed of high definition television content is again received and displayed.

These and various other features as well as advantages which characterize the present invention will be apparent from a reading of the following detailed description and a review of the associated drawings.

DETAILED DESCRIPTION

Figure 1:
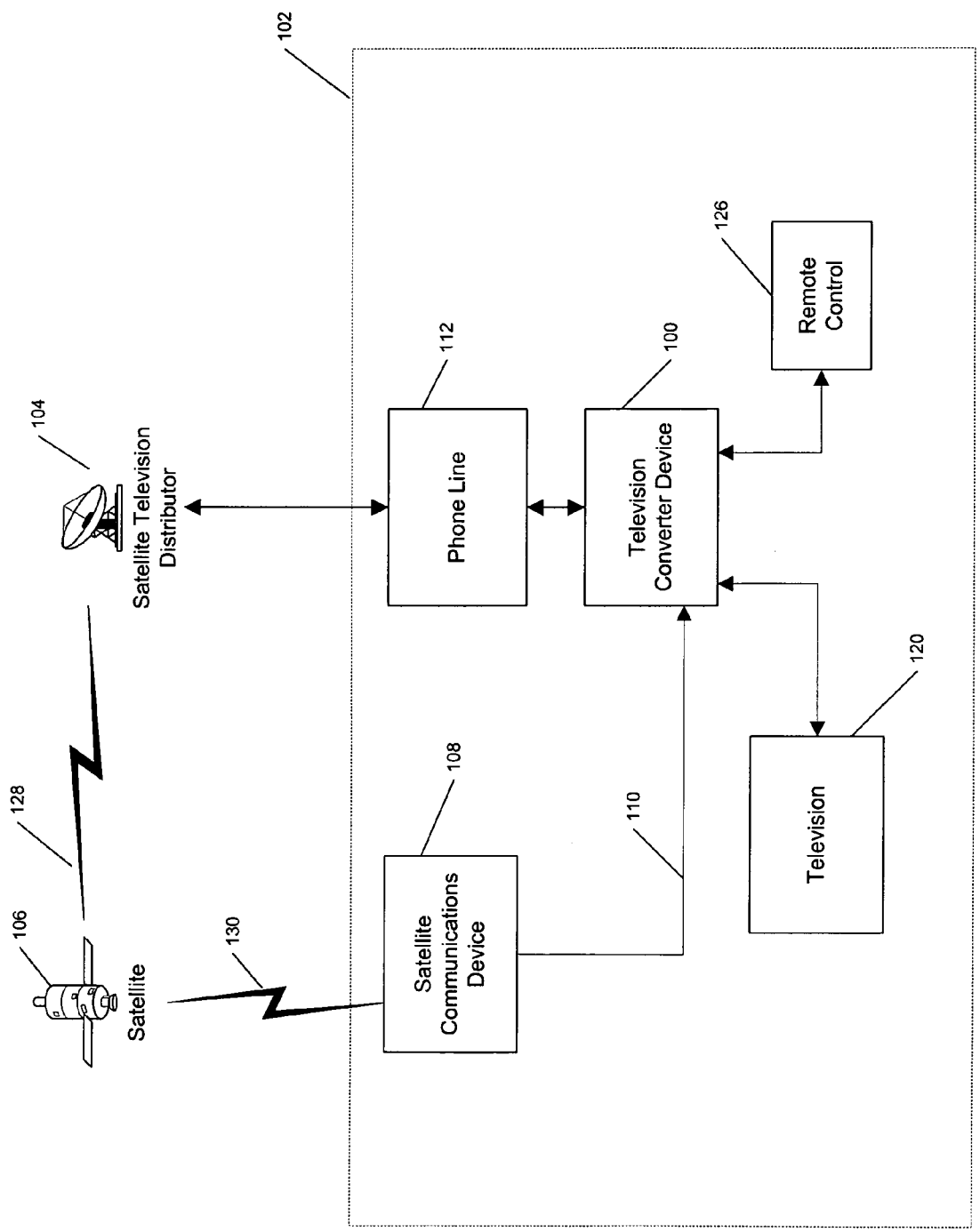
FIG. 1 is a high-level block diagram of an entertainment system using a television converter device of an embodiment of the present invention.

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television recording devices. One skilled in the art will recognize that the present invention can apply elsewhere. While the invention has been particularly shown and described with reference to preferred embodiments thereof, it will be understood by those skilled in the art that various other changes in the form and details may be made therein without departing from the spirit and scope of the invention.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television converter device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and DVR.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may occupy.

Turning now to the Drawings, wherein like numbers denote like parts throughout the several views, FIG. 1 presents an embodiment of an entertainment system 102 that includes a television converter device 100 in the form of a satellite set-top-box. Generally, the satellite set-top-box 100 may receive one or more television signals from a cable television distributor, from a broadcast television distributor or from a satellite television distributor 104. As a preferred embodiment, entertainment system 102 receives signals from satellite television distributor 104. One skilled in the art will recognize that set-top-box 100 may also receive video-digital subscriber line (VDSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below. One skilled in the art will recognize that many embodiments of the entertainment system 102 are possible and within the scope of this invention. Other such embodiments may include, but are not limited to, various combinations or permutations of devices and connections for the delivery, storage, and display of communications, content and other data.

To further describe the entertainment system 102, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

Figure 2:
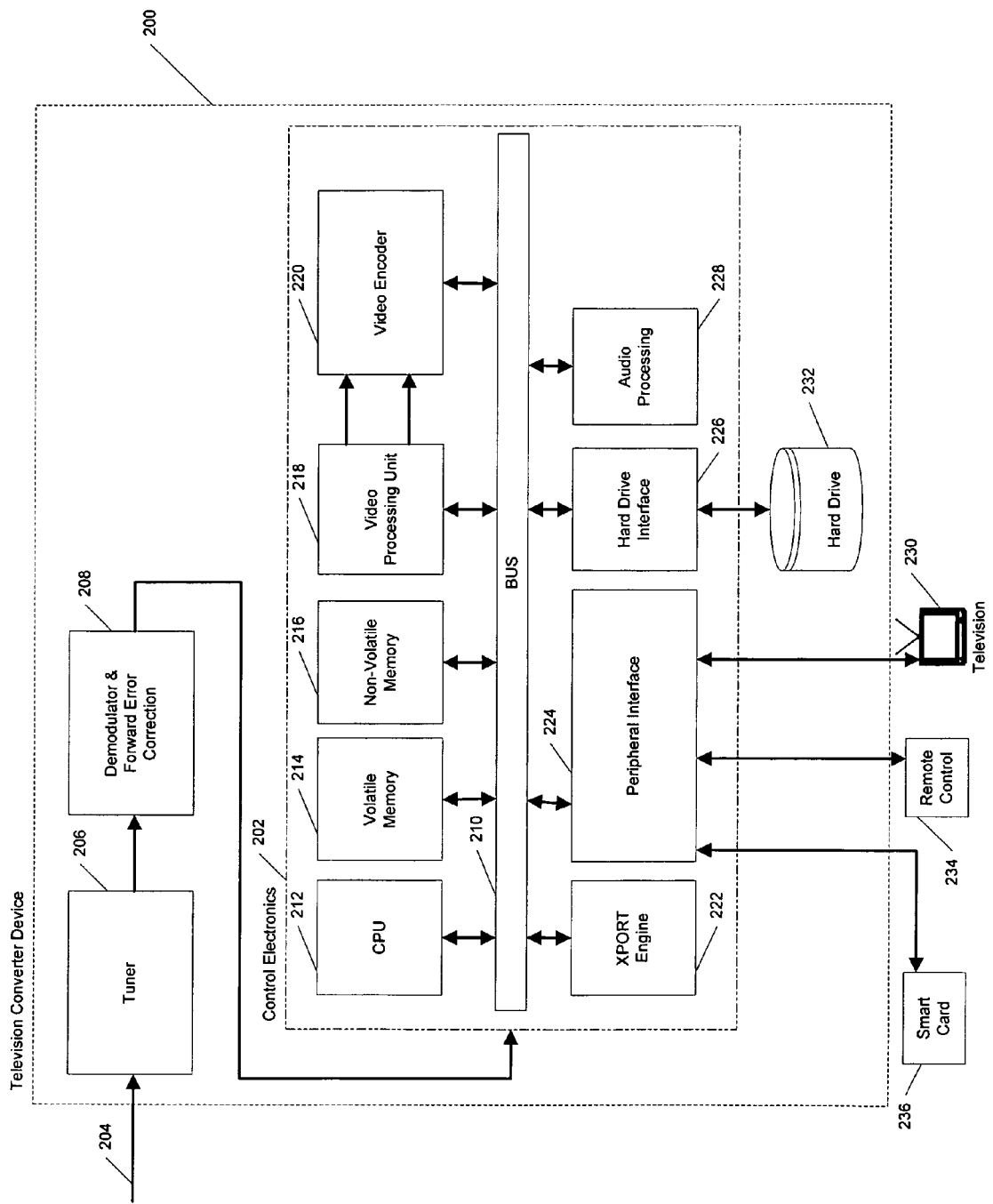
FIG. 2 is a high level block diagram of a television converter device of an embodiment of the present invention.

FIG. 2 provides a high level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206 that may receive a satellite signal 204. In this embodiment, tuner device 206 acquires a satellite signal 204 from satellite television distributor 104. Tuner device 206 may initially process the satellite signal 204. Tuner device 206 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic G11 family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. A preferred embodiment of control electronics unit 202 contains a single CPU 212 that is operatively connected to the shared bus. In one embodiment, CPU 212 may be used, among other things, for logical operations for set-top-box 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may contain one or more volatile memory components 214. Volatile memory components 214 may include, but are not limited to, one or more SDRAM memory chips. Similarly, control electronics unit 202 may also contain one or more non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG, MPEG2 or MPEG4 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more storage interfaces or hard drive interfaces 226 and storage devices or hard drives 232. In a preferred embodiment, television converter device 200 contains one hard drive interface 226 and hard drives 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite STB 200. In the embodiment of FIG. 2, the connection to the storage device 232 is shown to illustrate the capability of the STB 200 to store television programming as temporary and persistent recordings. In the embodiment the storage device 232 provides the long-term storage functionality of the STB (i.e. records and stores persistent recordings and may also include operating system software and other data or software necessary to the STB 200) and the short-term storage functionality (i.e. records and stores temporary recordings). The storage device 232 may include, for example, one or more devices, such as hard drives, as well as supporting hardware and software. In the embodiment of FIG. 2, all temporary and persistent recordings are located on the storage device 232. In the embodiment shown, the hard drive 232 comprises an 80 GB 'winchester' hard drive connected to the control electronics via a standard IDE/EIDE interface cable. As another example, hard drive 232 may be used to temporarily store data for processing by CPU 212. In this example, the hard drive 232 may allow the processor 212 to separate EPG data arriving as part of digital stream 204. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite STB 200. For example, an external hard drive 232 may be connected to satellite STB 200 using USB 2.0 or IEEE 1394 (FireWire) connections. Such an external hard drive may include a screen for portable viewing of programming stored on it. Furthermore, in embodiments of the present invention, the storage device 232 contains expansion slots, such as IDE connections, for the provision of additional storage devices to provide additional capacity at a later time. In addition, some embodiments include connections for external storage devices such as DVD-Rs that provide the capability of using the external devices as if they were an internal storage device. The design and operation of hard drives and similar devices are well known in the art and need not be described further here.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo, television 230, smart card 236, VCR, or other devices. In a preferred embodiment, entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder, on the other hand, may send video or audio signals to the satellite set-top-box 100 or receive audio and video signals from the set-top-box to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The entertainment system 102 may also include a remote control 126, 234 peripheral device, also sometimes referred to as a remote. The remote control 234 may be used to send commands to the satellite set-top-box 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the entertainment system 102, including, but not limited to, a television, stereo, VCR, or DVD player. The set-top-box 200 may also be able to send signals to the remote control 234, including, but not limited to, signals to configure the remote control 234 to operate other peripheral devices in entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite set-top-box 200, one skilled in the art will recognize that other means of communicating with the set-top-box 200 are available, including, but not limited to attached keyboards, front panel buttons or touch screens.

The satellite set-top-box 200 may also include a remote control interface. A remote control interface may include any means for the user to communicate to the satellite set-top-box 200, and may be implemented using the peripheral interface 224 of control electronics unit 202 or by connecting a peripheral remote control interface device. In a preferred embodiment, a remote control interface may receive commands from one or more remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite set-top-box 200 may include a phone line and modem. Set-top-box 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 100. For example, the phone line may communicate with the satellite set-top-box 100 using an RJ-11 style telephone connection. One skilled in the art will recognize that there are many other uses for this phone line connection. For example, EPG data may be transmitted to set-top-box 200 via phone line or in the satellite signal 204. One skilled in the art will recognize that the EPG data may be transmitted to set-top-box 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data. One skilled in the art will also recognize that a phone line connection may permit networked communications with other network-ready devices using the telephone wiring within a subscriber's location.

A satellite set-top-box 200 may also include network connectivity. For example, peripheral interface 224 may include components or interfaces that permit the connection of RJ-45 cabling and transmission of TCP/IP traffic to other connected devices. As another example, a wireless router may be attached via peripheral interface 224 to allow wireless local-area-network (WLAN) data communications using a standard wireless networking protocol such as WiMAX, 802.11b or 802.11g. One skilled in the art will recognize that various other network connections to the set-top-box 200 are possible.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto. It will also be recognized that the operations may be performed by the television converter device or at the source of the television content, for example, via the television distributor 104.

Figure 3:
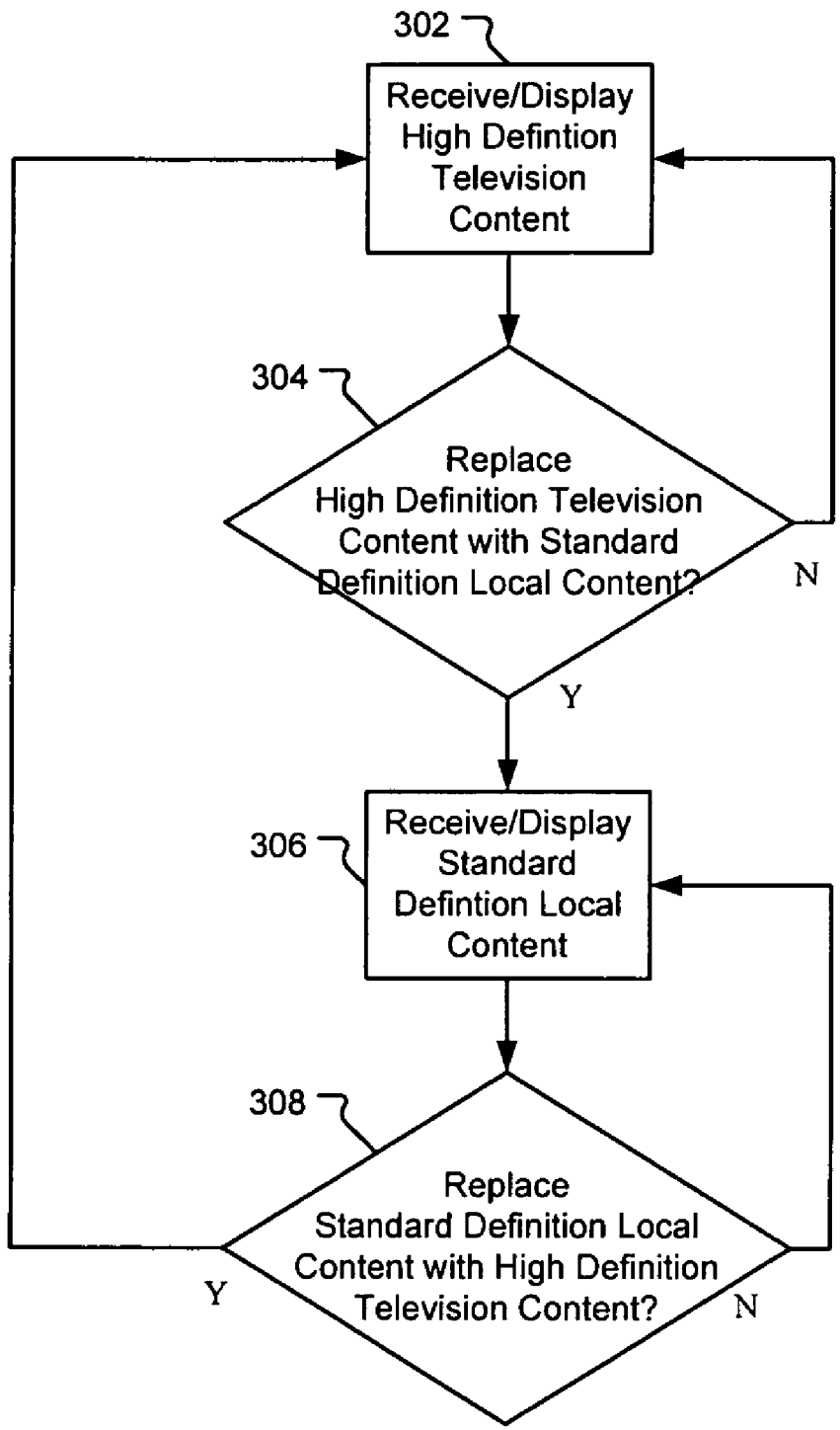
FIG. 3 is a flow chart of a method of displaying local standard definition television content in accordance with a preferred embodiment of the present invention.

FIG. 3 presents an embodiment of a method of providing standard definition local television content for a high definition content stream or "feed." The method starts with a receiving operation 302 that receives a feed of high definition television content, such as a sports event or movie. The received feed may be displayed on a display device such as a TV as part of the receiving operation 302. In an alternative embodiment, the feed may be recorded or otherwise transmitted to additional equipment for further processing.

The high definition television content received in the high definition television content receiving operation 302 is not local television content. Rather, the substantially national feed has non-local television content in addition to the primary event (e.g., the sports event or movie), such as non-local advertising, news, or other television content. The phrase "substantially national feed" is used to indicate that the feed is available to many locations for which the feed does not contain local television content.

A determination operation 304 monitors the substantially national feed and determines when the high definition content should be replaced with corresponding standard definition local television content. In one embodiment, the substantially national feed of high definition television content may be compared to a local feed of standard definition television content directly. When the television content of the national feed and that of the local feed differ, then the determination operation 304 determines that the television content of the local feed should replace the high definition television content.

In an alternative embodiment, a signal associated with said high definition national television content may be received indicating that standard definition local content should be displayed instead of the high definition television content. This signal may be included as part of or with the high definition television content. Alternatively, the signal may be provided separately. For example, the signal may be provided by the local feed or on a separate feed.

When the determination operation 304 determines that the high definition television content should be replaced by the standard definition television content, a standard definition television content receiving operation 306 receives the standard definition television content. In the embodiment wherein the high definition television content is received and displayed by the high definition television content receiving operation 302, the standard definition television content receiving operation 306 also displays the standard definition television content (instead of the previously displayed high definition television content).

The standard definition television content may be received in any way. For example, the standard definition television content may be available from a local feed delivered by a broadcast television provider. Alternatively, the standard definition television content may be a different feed supplied via the same delivery mechanism (e.g., via cable or satellite distribution) as the substantially national feed.

In an alternative embodiment, the high definition television content is replaced by the standard definition television content. Thus, an aggregate high definition/standard definition data stream is created wherein the primary event is in high definition and the advertisements, news, etc. are the local television content in a standard definition format. The data stream can then be transmitted to any connected device for storage, display or other processing.

The standard definition television content receiving operation 306 is followed by a second determination operation 308. The second determination operation 308 determines when the standard definition content should be replaced with corresponding high definition television content on the substantially national feed. The second determination operation 308 may make this determination in a similar fashion as the first determination operation 304.

When the second determination operation 308 determines that the standard definition television content should be replaced by the high definition television content, flow returns to the high definition receiving operation 302 as described above.

Figure 4:
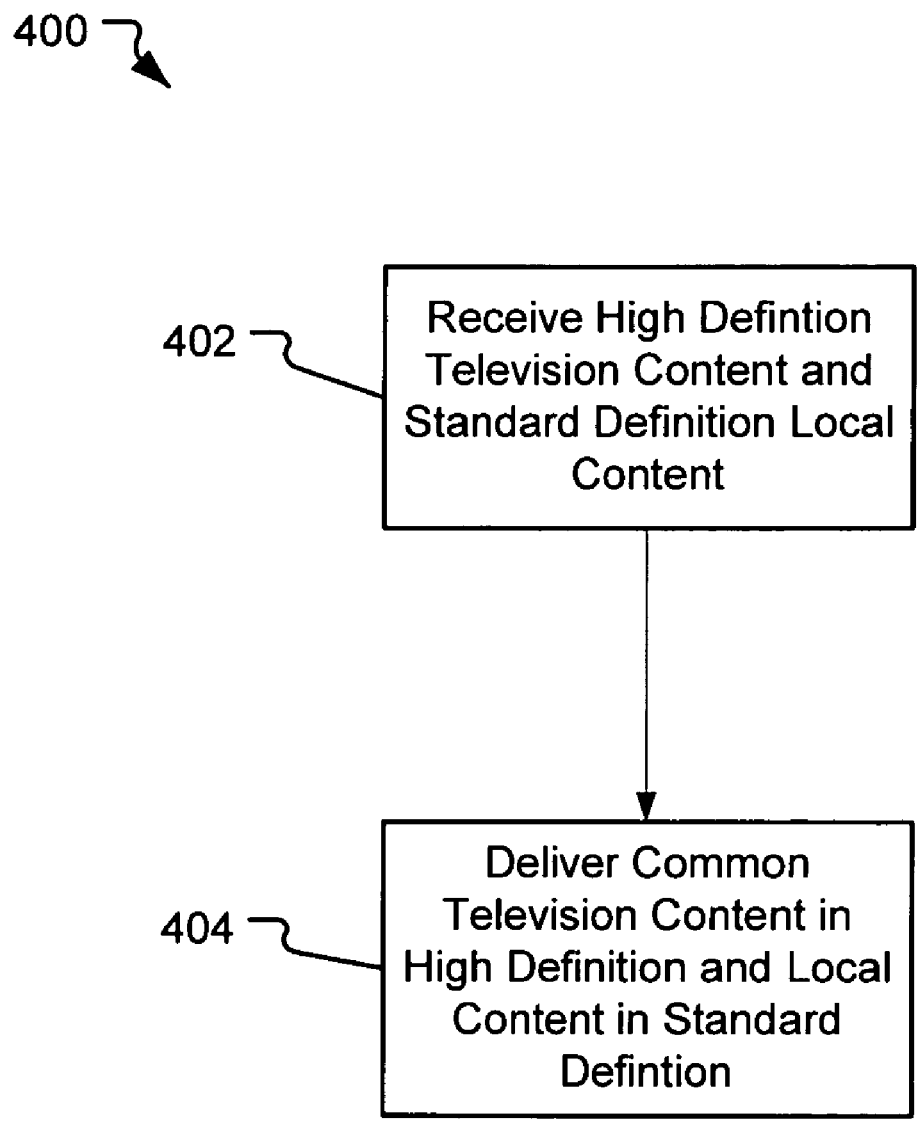
FIG. 4 is a flow chart of the state chart preparation subroutine in accordance with a preferred embodiment of the present invention.

FIG. 4 presents an embodiment of a method 400, such as may performed by a set top box, of replacing high definition, but non-local, television content with standard definition local television content. In the method, a receiving operation 402 receives a substantially national feed and a local feed. One skilled in the art will recognize that receiving in this context means that the feeds are available for display. The feeds need not be received on the same signal or by the same mechanism. For example, the high definition television content may be received digitally from a satellite transmission and the local feed may be received in an analog form via an antenna as in a conventional broadcast system.

The two feeds may differ in the advertising, news and other ancillary television content but include, at least in part, the some of the same television content. However, the substantially national feed provides all its television content at a high definition while the local feed supplies standard definition television content, or vice versa. The portion of the two feeds that is shared will be referred to as the "common" television content, but the reader will understand that while the content is common, the format (high definition or standard definition) differs. Similarly, the television content on the local feed that is not also on the substantially national feed will be referred to as the "local" content.

Upon receipt of a user command to deliver the common television content, such as to a TV for display or to a PVR for recording, a delivery operation 404 delivers the common television content from the substantially national feed. Thus, the common television content is delivered in a high definition format. In addition, the local content is delivered from the local feed during periods when the substantially national feed and the local are not delivering the common television content.

The delivery operation 404 may include monitoring the two feeds in a monitoring operation (not shown). The monitoring may take the form of monitoring for a signal as described below or comparing the content on the feeds. The delivery operation 404 then determines when common television content is on the feeds.

In one embodiment implemented by a set top box having multiple channel selectors, the delivery operation 404 may include monitoring the each feed using a different channel selector. When common television content is on both feeds, a first channel selector that is receiving the high definition television content is used to deliver the content. When the television content of the two feeds differs, the standard definition television content is delivered using the second channel selector.

In an alternative embodiment, a single channel selector may periodically sample the feed currently not being delivered to ascertain when to switch between feeds. Such sampling may be performed substantially simultaneously with delivery of the television content on the other feed so as not to be perceptible to a viewer.

In yet another embodiment, the delivery operation 404 may determine when to switch between feeds based on a signal provided for that purpose. The signal may be provided on one or both feeds with the television content, or may be provided separately. For example, a signal may be included with the high definition national television content indicating that standard definition local content should be displayed instead. These signals may include a time period for displaying the local content or some other information usable for determining when to switch back to the high definition television content.

The delivery operation 404 may be performed automatically, whenever delivering common television content, or may occur only as the result of specific user commands or preferences. For example, every time a user selects the local feed, the user may be asked if the user would like to view the common content in high definition. Alternatively, the user may make a single preference selection to deliver high definition content whenever common television content is delivered to a TV. Such a preference selection may also distinguish between delivering the common television content for display or for recording, so that the user can have high definition television content preferentially displayed, but have standard definition television content preferentially recorded, in order to save space on the recording media.

In yet another embodiment, the receiving operation 402 may receive the local content prior to receiving the high definition common television content. The local content may be stored temporarily for delivery during periods when the common television content is not supplied by the substantially national feed.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, when the determination is made to replace the high definition television content, a predetermined standard definition stream of television content may be displayed. This predetermined stream could be previously stored in anticipation of use in the high definition stream or serially retransmitted to the device performing the method. The television content in the predetermined stream may consist of advertisements or other television content that were not broadcasted as part of a local feed, but rather provided solely as content to be inserted into the national feed at that location. Once the predetermined stream has been displayed, the high definition television content would again be displayed, picking up where the high definition television content left off. As another example, an alternative high definition local stream may replace a national stream of another high definition stream of local television content. For example, a programming distributor may save transmission bandwidth by distributing only high definition content from major metropolitan areas. If a user has access to a stream of more local high definition content than the major metropolitan high definition content, then the user may desire to replace the major metropolitan high definition content with their more local high definition content. Numerous other changes may be made which will readily suggest themselves to those skilled in the art and which are encompassed in the spirit of the invention disclosed and as defined in the appended claims.

What is claimed is:

1. A method of providing standard definition local television content for a high definition national feed comprising:
   receiving a substantially national feed of high definition television content;
   receiving corresponding standard definition local television content;
   monitoring the substantially national feed of high definition television content and the standard definition local television content to determine when the substantially national feed of high definition television content and the standard definition local television content represent common television content;
   displaying the substantially national feed of high definition television content when the substantially national feed of high definition television content and the standard definition local television content represent common television content; and
   displaying the standard definition local television content when the substantially national feed of high definition television content and the standard definition local television content do not represent common television content.

2. A method of providing standard definition local television content for a high definition national feed according to claim 1 wherein the standard definition television content comprises advertising content.

3. A method of providing standard definition local television content for a high definition national feed according to claim 2 wherein the standard definition television content comprises local advertising content.

4. A method of providing standard definition local television content for a high definition national feed according to claim 1, further comprising recording the standard definition local television content when the substantially national feed of high definition television content and the standard definition local television content represent common television content.

5. A method of providing standard definition local television content for a high definition national feed according to claim 1, wherein the standard definition local television content is received prior to receiving the high definition television content and wherein the method further comprises:
   storing the standard definition local television content until the standard definition local television content is displayed.

6. A method of providing standard definition local television content for a high definition national feed according to claim 1, wherein substantially all of the high definition television content is displayed and wherein the method further comprises:
   buffering the high definition television content for later display while the corresponding standard definition local television content is being displayed.

7. A home entertainment system comprising:
   a television converter device; and a connected TV,
   the home entertainment system adapted to perform the method of claim 1.

8. A method of displaying television content using a television converter device and a connected TV comprising:
   receiving, by the television converter device, a first feed of standard definition local content;
   receiving, by the television converter device, a second feed of high definition television content; and
   upon user selection to display the first feed, delivering to the connected television the high definition television content from the second feed when the standard definition local content and the high definition television content are common television content, and delivering to the connected television the standard definition local content from the first feed when the standard definition local content and the high definition television content are not common television content.

9. A method of displaying television content in accordance with claim 8, wherein the first feed is received by a first channel selector, and wherein receiving the second feed of high definition television content further comprises:
   selecting the second feed with a second channel selector; and
   substantially simultaneously receiving, by the television converter device, the high definition television content with the second channel selector.

10. A method of displaying television content in accordance with claim 8, further comprising:
    storing the standard definition local content until delivery to the connected television.

11. A method of displaying television content in accordance with claim 8, further comprising:
    receiving, by the television converter device, a user input to record the standard definition local content instead of the high definition television content when delivering to the connected television the high definition television content; and
    recording, at the television converter device, the standard definition local content while delivering to the connected television the high definition television content.

12. A method of displaying television content in accordance with claim 8, further comprising:
    receiving a user selection indicating that the user prefers to view high definition television content.

13. A method of displaying television content in accordance with claim 8, further comprising:
    informing the user that high definition television content corresponding to the standard definition local content of the first feed is available for display; and
    after informing the user, receiving a user command to display common television content in high definition and local content in standard definition.

14. A television converter device comprising:
    at least one channel selector adapted to receive one of a first feed of standard definition local content and a second feed of high definition television content; and
    means for preferentially displaying the high definition television content when the standard definition local content and the high definition television content are common television content.

15. A television converter device according to claim 14 comprising:
    a satellite communication device simultaneously receiving the second feed and the first feed.

16. A television converter device according to claim 15 wherein the satellite communication device also receives a signal indicating which content to display.

17. A television converter device according to claim 14 comprising:
    a second channel selector simultaneously receiving the other one of the first feed of standard definition local content and the second feed of high definition television content.

* * * * *

UNITED STATES PATENT AND TRADEMARK OFFICE
CERTIFICATE OF CORRECTION

PATENT NO.        : 7,697,070 B1                                           Page 1 of 1
APPLICATION NO. : 11/118464
DATED             : April 13, 2010
INVENTOR(S)       : Michael T. Dugan, Mark W. Jackson and Daniel J. Minnick It is certified that error appears in the above-identified patent and that said Letters Patent is hereby corrected as shown below:

Column 13, line 14, insert the following before displaying the substantially: --transforming into a display format and--.
Column 13, line 19, insert the following before displaying the standard: --transforming into the display format and--.
Column 13, line 57, the second occurrence of "the" should be changed to --a--.
Column 13, line 58, the words "claim 1" should be deleted and replaced with the following:
--providing standard definition local television content for a high definition national feed, the method comprising:
   receiving a substantially national feed of high definition television content;
   receiving corresponding standard definition local television content;
   monitoring the substantially national feed of high definition television content and the standard definition local television content to determine when the substantially national feed of high definition television content and the standard definition local television content represent common television content;
   displaying the substantially national feed of high definition television content when the substantially national feed of high definition television content and the standard definition local television content represent common television content; and
   displaying the standard definition local television content when the substantially national feed of high definition television content and the standard definition local television content do not represent common television content--.
Column 13, line 65, following the word delivering, insert --from the television converter device--.
Column 14, line 3, following the word delivering, insert --from the television converter device--.
Column 14, line 48, cancel the text beginning "means for preferentially displaying" and replace it with --control electronics adapted to display--.
Column 14, line 51, following the words television content, insert --, and to display the standard definition local content when the standard definition local content and the high definition television content are not common television content--.

Signed and Sealed this

Twenty-eighth Day of September, 2010

David J. Kappos
*Director of the United States Patent and Trademark Office*